Nov. 27, 1923.
H. S. OSBORNE
1,475,240
LOW FREQUENCY MEASURING DEVICE
Filed April 11, 1919
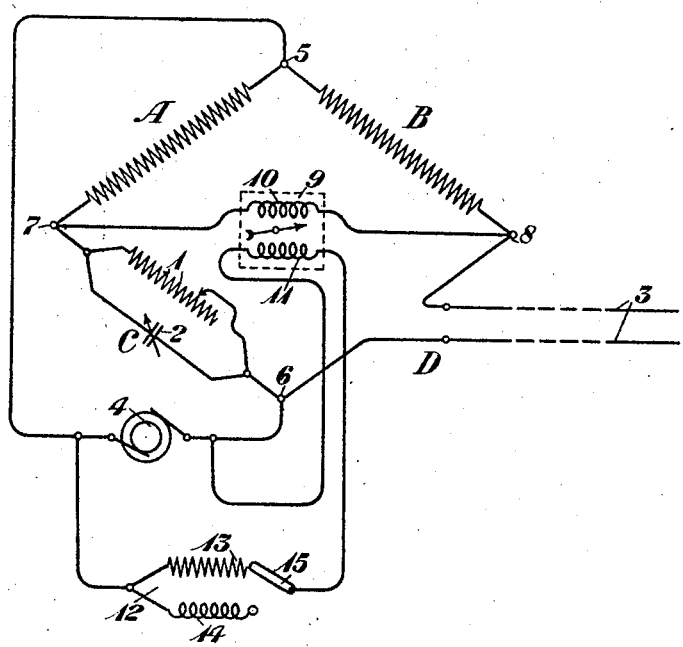
INVENTOR.
H. S. Osborne
BY
ATTORNEY.

Patented Nov. 27, 1923.

1,475,240

UNITED STATES PATENT OFFICE.

HAROLD S. OSBORNE, OF NEW YORK, N. Y., ASSIGNOR TO AMERICAN TELEPHONE AND TELEGRAPH COMPANY, A CORPORATION OF NEW YORK.

LOW-FREQUENCY MEASURING DEVICE.

Application filed April 11, 1919. Serial No. 289,395.

*To all whom it may concern:*

Be it known that I, HAROLD S. OSBORNE, residing at New York, in the county of New York and State of New York, have invented certain Improvements in Low-Frequency Measuring Devices, of which the following is a specification.

This invention relates to measuring or testing instruments, especially such as are used for measuring the impedance of circuits at the lower frequencies. Its object is to provide an arrangement for this purpose of a simple and efficient character which shall be unaffected by electrical disturbances occurring in the circuit whose impedance is being measured.

The accompanying drawing shows diagrammatically an arrangement embodying the invention.

Where it is desired to balance a real line by an artificial line for duplex operation or other purposes, it becomes important to determine the impedance of the real and artificial lines, or their impedance unbalance, over a wide range of frequencies, say from zero to four thousand. For the lower frequencies, it is necessary to provide special apparatus to give readings or indications responsive to such frequencies, and it is also desirable to have the instrument used unaffected by disturbances occurring in the circuit to be measured. When dealing with ocean cables especially, disturbances interfering with the measurements are likely to occur, and the requirement for an exact balance in such cables makes it important that the measurements be especially accurate.

In the drawing A, B, C and D represent the four arms of a Wheatstone bridge of known form, A and B being here represented as fixed impedances, such as resistance of suitable value, and C as composed of a variable resistance 1 and a variable capacity 2 connected in parallel. D is the arm of the bridge in which the unknown element—in this instance the line 3—is to be connected for measurement.

A source of alternating current 4 of variable frequency is connected across the bridge between the points 5 and 6 which represent the junction of the arms A and B and the arms C and D respectively. Between the other points of the bridge 7 and 8 is connected the indicating device 9 which in this instance is a dynamometer having one of its coils 10 connected between the points 7 and 8, and its other coil 11 directly connected across the source of current 4.

As is well known, an instrument of this type gives a reading by reason of the reaction of one coil upon the other and will, therefore, indicate no current flow if either of its coils is unexcited. If, therefore, a disturbing current arising in the line 3 gets into the coil 10 it will not adversely affect the readings because this current will not be present in the coil 11, since the latter is practically short-circuited by the dynamo 4. If the disturbing current were of the same, or substantially the same, frequency as the current for the moment being generated by the dynamo 4, a disturbance would, of course, result, but if the frequency of the two currents were different the tendency, due to the reaction between the dynamo current and the disturbing current, would be to move the pointer very rapidly first in one direction and then in the other, the net result of which would be that the pointer would remain motionless. Since the likelihood that there will be a disturbing current of the same frequency as the testing current is very remote, the instrument may be regarded for all practical purposes as unaffected by disturbing currents in the line.

The circuit of the coil 11 should be provided with a phase shifting device such as indicated at 12, to enable the observer to discriminate between true balance, when there is absence of current in coil 10, and false balance, i. e. due to currents in the two coils 10 and 11, whose phase relation approaches quadrature, since as is well known the two coils of the dynamometer do not react when the currents are 90° out of phase. The phase shifting device may be composed as shown of a resistance 13 and an inductance 14 with a switch 15 for putting the resistance and inductance alternately into the circuit. If the apparent balance is then due to a 90° relation of the currents the shifting of phase brought about by the operation of the switch 15 will show the fact.

For the sake of simplicity no showing has been made in the drawing of transformers for interconnecting the various elements of the circuit which may be desirable under various circumstances for properly relating the impedance existing between different parts of the apparatus. It may also be found desirable in some instances to use amplifiers in the circuit of one or both of the coils of the dynamometer. The application and effect of these would be obvious.

The invention is not limited to the exact circuits herein shown and described as it is obvious that various modifications may be made without departing from the spirit and scope of the invention.

What I claim is:

1. In a device for measuring the impedance of a line for different frequencies, the combination of a source of current, an indicating device comprising two current responsive elements which cooperate to produce the indications thereon, an adjustable impedance designed to have reactances of a character to balance the line to be measured, means for so connecting said current source, the adjustable impedance, the impedance to be measured and one of the elements of the indicating device that the current flowing through said element of the indicating device from said source is dependent upon the relative value of the adjustable impedance and the impedance to be measured, and means for so connecting the other element of said indicating device to said source that it is unaffected by disturbing potentials in said impedance to be measured.

2. In a device for measuring the impedance of a line for different frequencies, the combination of a source of alternating current, an indicating device comprising two current responsive elements which cooperate to produce the indications thereon, and one of which is normally constantly energized by current from said source, an adjustable impedance designed to balance the line to be measured, means for so connecting said current source, the adjustable impedance, the line to be measured and the other element of said indicating device, that said other element is unenergized when said adjustable impedance balances the line to be measured, and means for shifting at will the phase of the current in one of said elements.

3. In a device for measuring the impedance of a line for different frequencies, the combination of three elements forming the known impedances of a Wheatstone bridge, one of which elements is adjustable and comprises reactances designed to balance the reactances of the line, means for connecting thereto a line to be measured to form a fourth arm of the bridge, a source of current connected across the bridge in one direction, and an indicating instrument comprising two cooperating coils, one of which is connected across the bridge in the other direction, and means for so connecting the other coil of said instrument to said apparatus as to receive constant excitation from said source but to be unaffected by disturbing potentials in the impedance to be measured.

4. In a device for measuring the impedance of a line for different frequencies, the combination of three elements forming the known impedances of a Wheatstone bridge, one of which elements is adjustable and comprises reactances designed to balance the reactances of the line, means for connecting thereto a line to be measured to form a fourth arm of the bridge, a source of alternating current connected across the bridge in one direction, an indicating instrument comprising two cooperating coils, one of which is connected across the bridge in the other direction, and the other of which is normally constantly energized by said source of current, and a phase shifting device associated with one of said elements.

In testimony whereof, I have signed my name to this specification this 8th day of April 1919.

HAROLD S. OSBORNE.